United States Patent [19]

Lammers

[11] 3,900,744

[45] Aug. 19, 1975

[54] HIGH SPEED ELECTRONIC CHANNEL DISCRIMINATOR

[75] Inventor: Uve H. W. Lammers, Chelmsford, Mass.

[73] Assignee: The United States of America as represented by the Secretary of the Air Force, Washington, D.C.

[22] Filed: Feb. 4, 1974

[21] Appl. No.: 439,661

[52] U.S. Cl. .............................. 307/235 R; 328/147

[51] Int. Cl.[2] .............................................. H03K 5/20

[58] Field of Search .................... 307/235 R, 235 A; 328/146.8; 340/179; 325/113; 179/15 BL

[56] References Cited

UNITED STATES PATENTS

| | | | |
|---|---|---|---|
| 3,534,353 | 10/1970 | Calkin et al. .................. | 328/148 X |
| 3,646,457 | 2/1972 | David et al...................... | 307/235 R |

*Primary Examiner*—John Zazworsky
*Attorney, Agent, or Firm*—Joseph E. Rusz; Willard R. Matthews, Jr.

[57] ABSTRACT

The invention is a high speed parallel processor for determining the maximum signal output channel of a one-dimensional n-channel array, under the condition that only a single maximum exists and the outputs of other channels decrease monotonically with increasing separation from the maximum output channel position along the array. The processor output voltage is taken from a network of n, series connected, resistors (one resistor for each channel) that are connected between a constant current source and ground. A signal level comparator circuit compares the signal level of each channel with the signal level on its preceding channel. When the signal level on any given channel is greater than the signal level on its preceding channel the comparator circuit generates a signal that effects switching of the resistor associated with that channel to ground.

1 Claim, 4 Drawing Figures

HIGH SPEED ELECTRONIC CHANNEL DISCRIMINATOR

BACKGROUND OF THE INVENTION

This invention relates to electronic channel discriminators, and in particular to devices of that type capable of identifying the maximum response channel in a multisensor system by means of high speed parallel processing electronic circuitry.

A number of situations exist where it is necessary to very rapidly measure a parameter of a pulsed signal, such as time delay, frequency, or angle of arrival. This can be done by means of an array of sensors, each of them producing a maximum response at a particular value of the measured parameter. Determination of the channel having the maximum signal level is commonly accomplished by sequential processing. However, various radar and direction finding systems require that the identification of the channel having maximum signal level be achieved in less time than can be obtained by sequential processing. There currently exists, therefore, the need for a high speed electronic parallel processor that can very rapidly identify the channel of maximum response and that produces a properly coded output signal indicating such channel. The present invention is directed toward satisfying this need.

SUMMARY OF THE INVENTION

The high speed processor of the invention includes a separate sensor for detecting the signal on each channel of the n-channel array to be monitored. The sensor outputs are amplified and compared to determine relative signal levels of successive pairs of channels. In any instance when a higher ordered channel output signal level exceeds the signal level of the lower ordered channel (of a particular pair of channels) a switch actuating signal is generated. The switch connects a resistance between a constant current source and ground. The resistance is characteristic of that particular higher ordered channel and the voltage drop across it provides an identifying output signal.

It is a principal object of the invention to provide a new and improved high speed electronic channel discriminator.

It is another object of the invention to provide a high speed electronic parallel processor capable of very rapidly identifying the channel of maximum response from one-dimensional multiple channel array.

These, together with other objects, features and advantages of the invention, will become more readily apparent from the following detailed description when taken in conjunction with the illustrative embodiments in the accompanying drawings.

DETAILED DESCRIPTION OF THE PREFERRED EMBODIMENT

Figure 1:
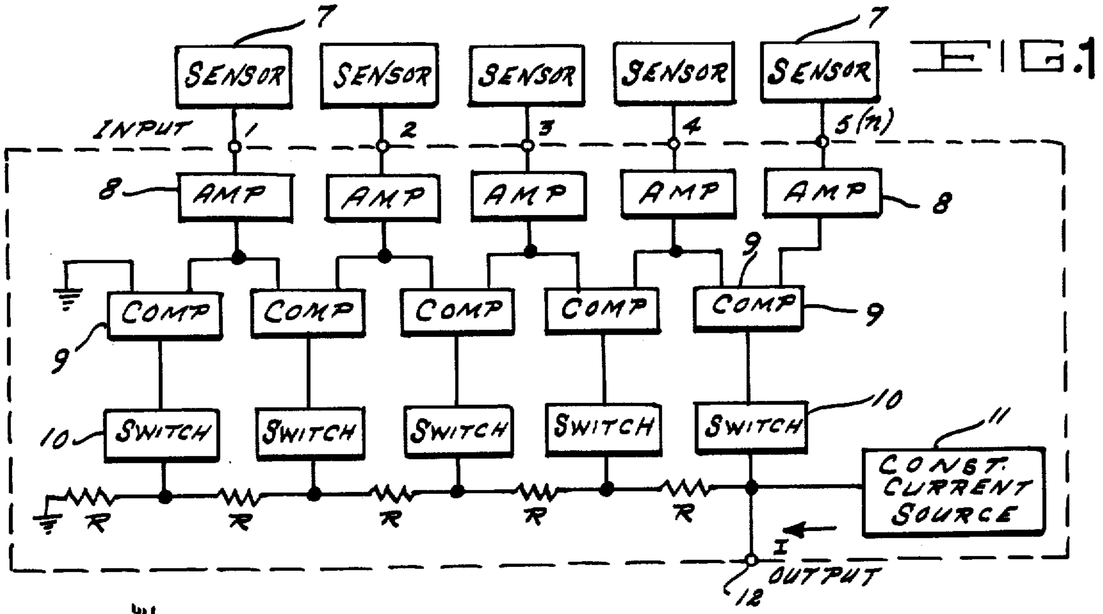
FIG. 1 is a block diagram of one presently preferred embodiment of the invention.

The parallel processor of the invention is illustrated in block diagram form in FIG. 1. Sensors 7 detect the input signal on channels 1–5 from the array to be monitored. Although a five-channel device is described by way of example, the invention, of course, pertains to any multiple or n-channel array. The signals detected by sensors 7 are amplified by amplifiers 8 and are fed to signal level comparators 9 in the manner shown. Under appropriate conditions the outputs of signal level comparators 9 operate the switches 10 which in turn short circuit the series connected circuit of resistors R to ground at the point at which they are connected. An electrical current is continuously supplied through the resistors R by means of constant current source 11. Output signals are taken at output terminal 12.

Figure 2:
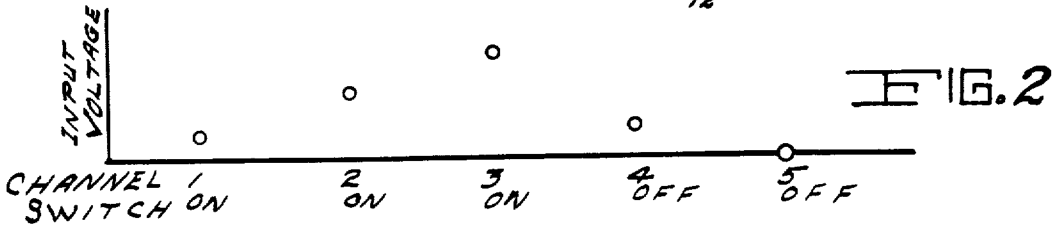
FIG. 2 is a graph illustrating the input voltage level on each channel of the device of FIG. 1.
Figure 3:
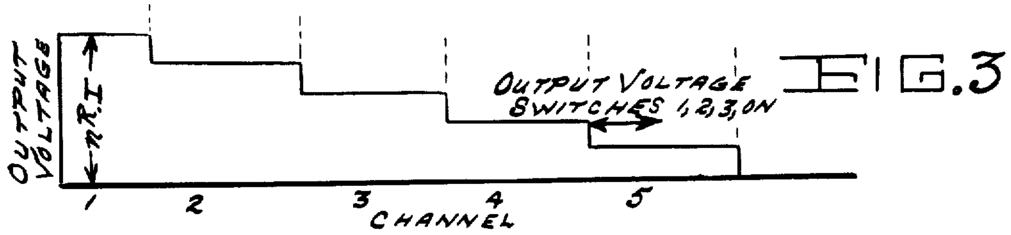
FIG. 3 is a graph illustrating the output voltage level for each channel of the device of FIG. 1.

In operation, sensors 7 produce positive input signals to the amplifiers 8 as indicated in the graph of FIG. 2. In the present example the input signal level peaks in channel 3. These input signals are amplified and then fed to comparators 9 in such a way that the inputs of each comparator are connected between the two adjacent amplifiers. Assuming very high comparator gain, the comparator output will be at its positive saturation level, if the right input is more positive than the left. Zero input difference will produce zero output, and if the left input is more positive than the right, the output assumes its negative saturation level. The switches 10 operated by the comparator outputs short circuit the string of resistors R to ground at the particular point to which they are connected, only if their input signal reaches the positively saturated comparator output level. For all other levels they are turned off. Constant-current source 11 produces a current through the string of resistors R, which does not change if any or all points along the string are grounded by the switches. It is typical under the single-maximum condition that the comparator connected to the maximum output stage and the stage immediately to its left is the highest one (in channel number) to turn on the switch connected to it. An output voltage proportional to the number of non-shorted resistors to the right of the maximum response channel is therefore a measure of the position of this channel. This is illustrated by the graph of FIG. 3.

Figure 4:
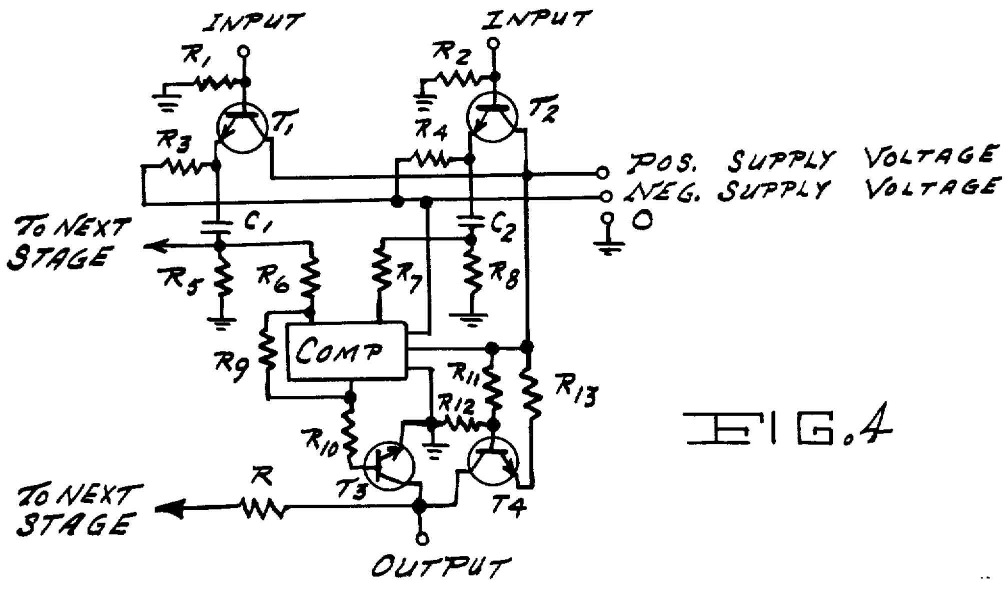
FIG. 4 is a schematic diagram of the solid state processor used in each channel of the device of FIG. 1.

Referring now to FIG. 4, the basic components of a solid state processor comprising one stage of the device of FIG. 1 are shown. Such a processor has a response time of approximately 200 nanoseconds. Input signals are amplified by emitter followers $T_1$ and $T_2$. Their output signals across resistors $R_3$ and $R_4$ are fed through capacitors $C_1$ and $C_2$ and resistors $R_6$ and $R_7$ to the comparator C inputs. Resistors $R_1$, $R_2$, $R_5$ and $R_8$ connect the transistor and comparator inputs back to ground. Resistors $R_5$ and $R_9$ serve as a negative feedback loop to stabilize the comparator gain and reduce the output offset. The comparator output signal is connected through resistor $R_{10}$ to the base of the switching transistor $T_3$. The independence of its collector current of the collector voltage over a wide range of collector voltages makes transistor $T_4$ work as a constant-current source. Resistors $R_{11}$, $R_{12}$ and $R_{13}$ determine the amount of current through $T_4$. Resistor R is the last one of the string of resistors as described previously. When the input voltage of transistor $T_3$ reaches the specified level, its collector voltage will essentially drop to zero and ground R. The additional stages of the processor are identical.

While the invention has been described in its preferred embodiment, it is understood that the words which have been used are words of description rather than words of limitation and that changes within the purview of the appended claims may be made without departing from the scope and spirit of the invention in its broader aspects.

What is claimed is:

1. A high speed parallel processor for determining the maximum signal output channel of a one-dimensional n-channel array comprising a parallel array of n signal sensing devices, a signal level comparator connected to compare the outputs of each adjacent pair of sensors, and a signal level comparator connected to compare the output of the first sensor with zero signal, each said comparator having first and second inputs and an output and being adapted to generate a switch actuating output signal only when the second input signal level is greater than the first input signal level, means connecting the first and second inputs of adjacent comparators, a constant current source, n resistors connected in series between said constant current source and ground, an output terminal connected between the $n^{th}$ resistor and said constant current source, a switch connected between the $n^{th}$ resistor and ground, and a switch connected between each resistor and ground, the output of each comparator being connected to and effective to actuate a discrete switch.

* * * * *